United States Patent [19]

Loose et al.

[11] Patent Number: 4,994,836
[45] Date of Patent: Feb. 19, 1991

[54] FILM PACKET IMPROVEMENT

[75] Inventors: Guenter H. Loose, Webster; Robert P. Bresnan, Rochester, both of N.Y.

[73] Assignee: Eastman Kodak Company, Rochester, N.Y.

[21] Appl. No.: 453,893

[22] Filed: Dec. 20, 1989

[51] Int. Cl.$^5$ ............................................ G03B 17/26
[52] U.S. Cl. .................................................. 354/282
[58] Field of Search .............. 354/176, 178, 179, 180, 354/181, 182, 276, 277, 278, 279, 281, 282, 283, 284, 285

[56] References Cited

U.S. PATENT DOCUMENTS

| | | | |
|---|---|---|---|
| 818,543 | 4/1906 | Leistenschneider | 354/282 |
| 3,586,501 | 6/1971 | Norquist et al. | 354/85 |
| 4,725,865 | 2/1988 | Hoffman | 354/276 |
| 4,821,054 | 4/1989 | Armbruster et al. | 354/282 |

Primary Examiner—Michael L. Gellner
Attorney, Agent, or Firm—William C. Dixon, III

[57] ABSTRACT

A packet for daylight-handling of photosensitive film and a cooperating holder mountable on a camera back. The packet has film removably attached to a carrier. The carrier has an asymmetrical tab at one end and a transverse light-locking element at its opposite end. Telescopically receivable over the carrier and film is a light-shielding envelope. The envelope has an open end that is closable by engagement with the light-locking element and a closed end with a squeezable area that overlies and, when grasped, squeezes the tab, to prevent inadvertent separation of the envelope from the carrier. An adjacent area, not overlying the tab, is graspable for pulling the squeezable area free of the tab and the envelope away from the film, to permit intended exposure. The envelope also has, near its open end, a stop strip for limiting envelope movement. The packet is slidably insertable into, and withdrawable from, the cooperating holder, which includes a spring-loaded pressure-applying member for maintaining the film in an exposure plane, a spring-loaded blocking member engageable with the light-locking element to retain the carrier in place, a pair of spring-loaded arresting members engageable by the stop strip to limit envelope movement while the carrier is retained, and a releasing member that is manually actuable for negating the spring-loadings on the pressure-applying, blocking, and arresting members, to permit unrestricted withdrawal of the packet from the holder.

10 Claims, 12 Drawing Sheets

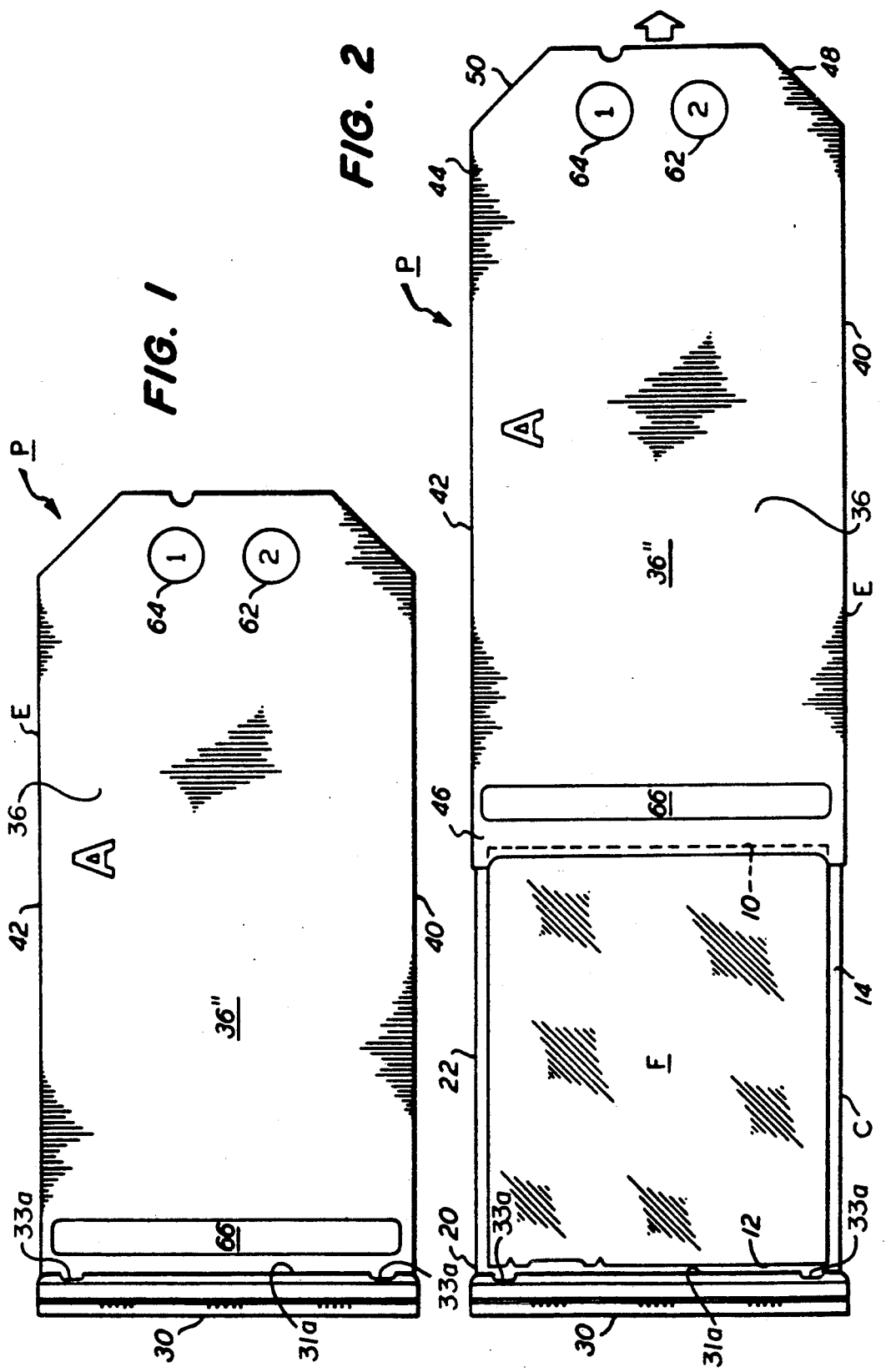

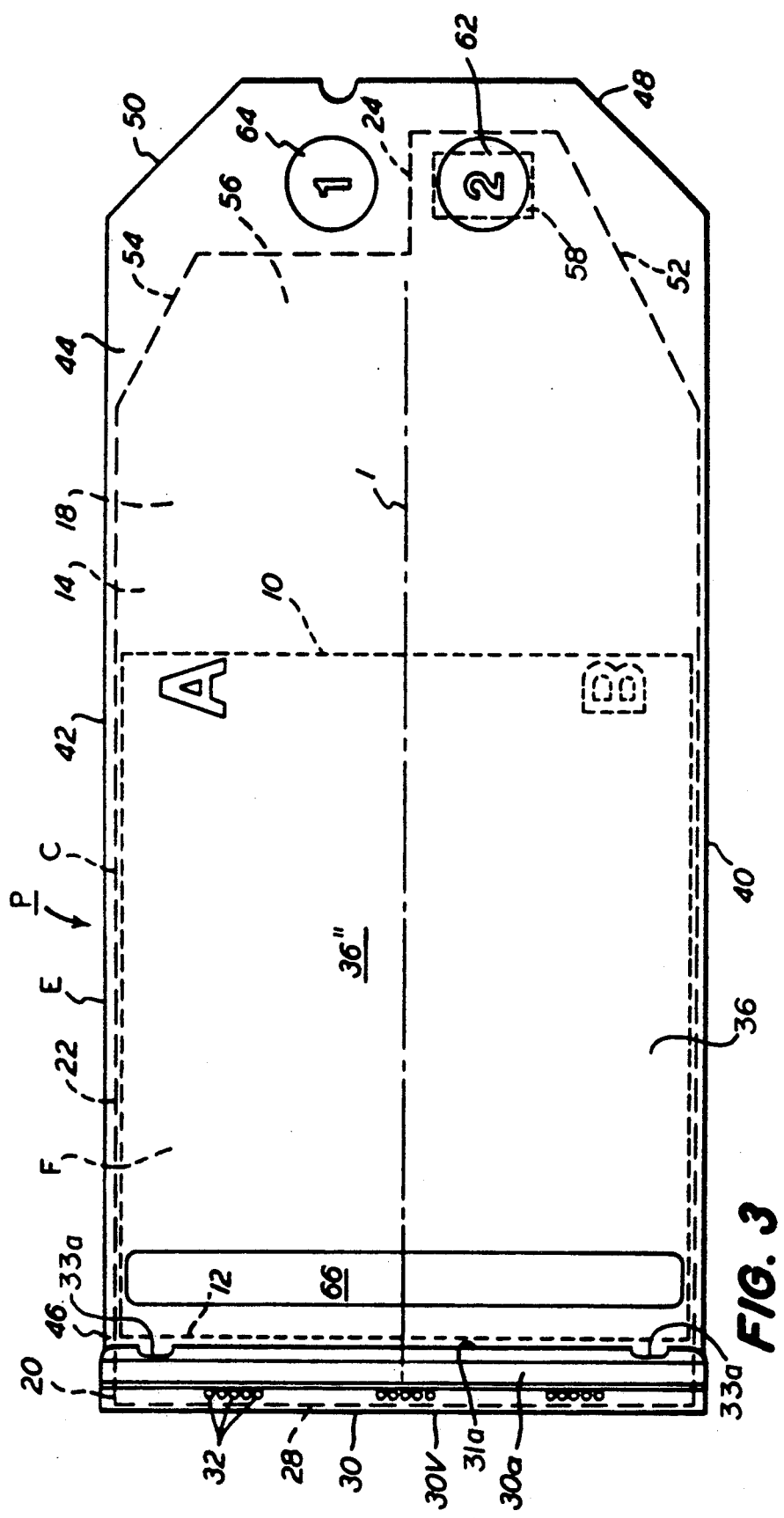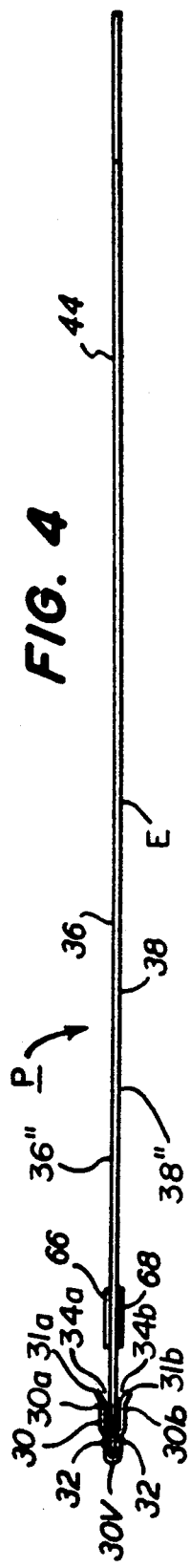
FIG. 3
FIG. 4

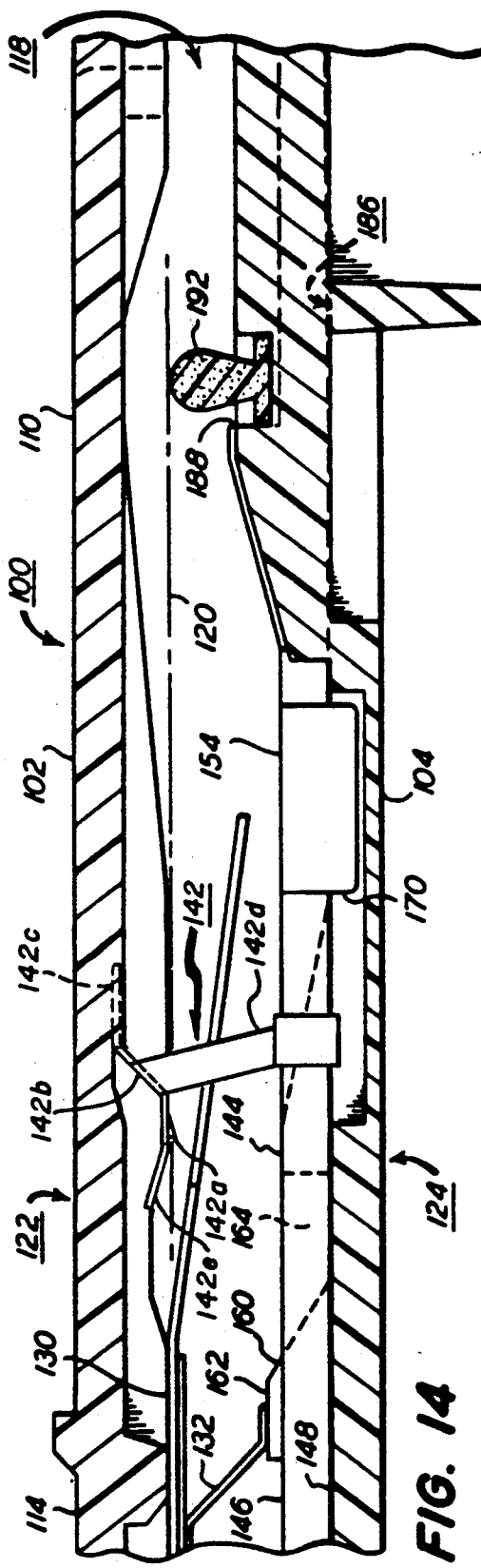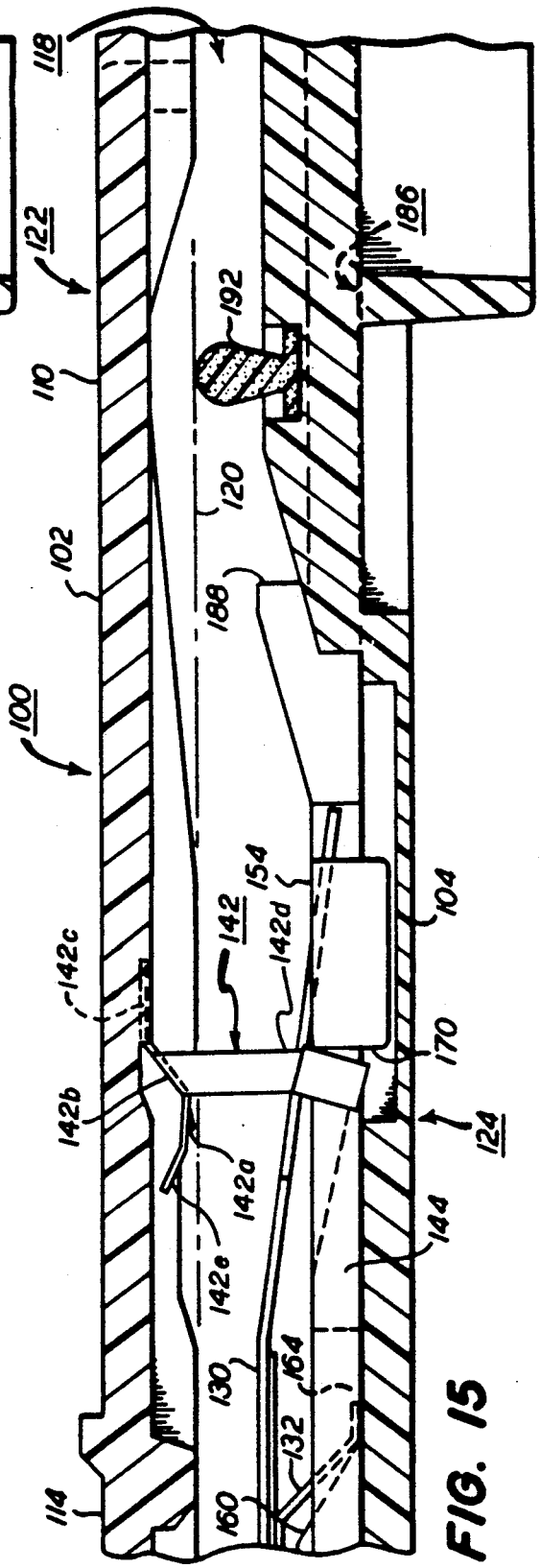
FIG. 14
FIG. 15

FILM PACKET IMPROVEMENT

CROSS-REFERENCE TO RELATED APPLICATION

Reference is made to commonly assigned, copending, related U.S. Pat. application Ser. No. 453,392, filed concurrently herewith on Dec. 20, 1989 in the names of Guenter H. Loose et al. and tilted FILM PACKET HOLDER IMPROVEMENT.

BACKGROUND OF THE INVENTION

1. Field of the Invention

The present invention relates generally to film assemblages, and particularly to such assemblages that provide for daylight-handling of one or more photosensitive film sheets therein in conjunction with a compatible film holder that is mountable on a photographic camera back.

2. Description of the Prior Art

The prior art is replete with film assemblages of the type referred to above. Examples may be found in the following documents.

U.S. Pat. No. 818,543—Discloses a photographic holder (g) in use with an assemblage comprising a film sheet (a) mounted on a carrier (b) and light-tightly enclosed by a withdrawable envelope (f); the assemblage has a manually graspable end portion extending outside the holder, where a medial part, but not the two lateral parts, of the enclosed carrier end is cut back to permit (by selective grasping) withdrawal of either the envelope alone or the whole assemblage.

U.S. Pat. No. 3,586,501—Discloses a self-processable film assemblage (10) in use with a film holder (32), the assemblage comprising a photosensitive film sheet (26) having at one end a transversely disposed "clip" (20) for closing a mating open end (12a) of a light-excluding envelope (12) telescopically received over the film sheet, the clip being adapted for selective engagement and disengagement by a latch (42) in the holder to prevent and permit, respectively, film sheet movement with the envelope when an externally accessible closed end (12b) thereof is pulled away from the holder, the closed end (12b) terminating in a pair of laterally offset graspable tabs (22, 24) extending respectively from opposing walls (14, 16) of the envelope, the film sheet (26) having a leader (50) extending therefrom toward the envelope closed end (12b) with a recessed end portion (50a) provided to allow only the envelope to be grasped and pulled from the holder, the envelope also having a stop-strip (46) transversely disposed thereon near its open end (12a) and engageable by another latch (48) in the holder to limit outward movement of the envelope.

U.S. Pat. No. 4,725,865—Discloses a photographic film assemblage (1a) usable with a cooperating film holder (47), the assemblage comprising a carrier (1) having twin film sheets (2) removably mounted on opposite faces of a film-carrying region (3) thereof, with an elongate, narrow tab portion (6) extending longitudinally from one end of the film-carrying region and a rigid, light-sealing "clip" (8) disposed transversely over both carrier faces at the opposite end, together with a light-excluding envelope (14) having an open end (15) that is telescopically slidable over the carrier and film sheets into light-sealing engagement with the clip and a closed end (20) that both conformably encloses and extends beyond the carrier tab portion (6), so that (by selective grasping) either the envelope alone may be pulled away from the carrier and film sheets or the whole assemblage may be pulled together, the clip (8) being engageable by a cooperating tab (43) in the holder to prevent the carrier and film sheets from moving when only the envelope is to be withdrawn, the envelope also having a pair of stop-strips (14a) disposed transversely on both walls thereof neat its open end (15), and engageable with a cooperating stop (43a) in the holder, to limit the extent of envelope withdrawal when either film sheet is to be exposed.

U.S. Pat. No. 4,821,054—Discloses a packet (P) for daylight-handling of photosensitive film (F, F') and a cooperating holder (H) mountable on a camera back. The packet (P) has film (F, F') removably attached to a carrier (C). The carrier (C) has, at one end (18), an asymmetrical tab (24) and, at its opposite end (20), a transverse light-locking element (30). Telescopically receivable over the carrier (C) and film (F, F') is a light-shielding envelope (E). The envelope (E) has an open end (46) that is closable by engagement with the light-locking element (30) and a closed end (44) with a squeezable area (62) that overlies and, when grasped, squeezes the tab (24), to prevent inadvertent separation of the envelope (E) from the carrier (C). An adjacent area (64), not overlying the tab (24), is graspable for pulling the squeezable area (62) free of the tab (24) and the envelope (E) away from the film (F, F'), to permit intended exposure. The envelope (E) also has, near its open end (46), a stop strip (66, 68) for limiting envelope (E) movement. The packet (P) is slidably insertable into, and withdrawable from, the cooperating holder (H), which includes a spring-loaded (132) pressure-applying member (130) for maintaining the film (F, F') in an exposure plane, a spring-loaded (140) latching member (138) engageable with the light-locking element (30) to retain the carrier (C) in place, a spring-loaded (142b, c, d) stopping member (142a) engageable with the stop strip (66, 68) to limit envelope (E) movement while the carrier (C) is retained, and a spring-loaded releasing member (144) that is manually actuable (184) for negating (158, 168 & 166) the spring-loadings (132, 140 & 142b, c, d) on the pressure-applying, latching, and stopping members (130, 138 & 142a), to permit unrestricted withdrawal of the packet (P) from the holder (H). To withdraw the packet (P) from this holder (H), it is necessary to both actuate and then hold the spring-loaded releasing member (144) in its fully actuated position while the packet (P) is being withdrawn. Should the user let go of the releasing member (144) before the packet (P) has been completely withdrawn, the spring-loaded stopping member (142a) will intercept the exiting light-locking element (30) and may then tear that element (30) from its carrier (C) and/or become damaged by it. This holder (H) has thus posed a problem to users who fail to hold the releasing member (144) in its fully actuated position while they pull the packet (P) out of the holder.

SUMMARY OF THE INVENTION

Accordingly, a primary object of this invention has been to solve the foregoing problem. Another object has been to do so in a highly effective and efficient manner. Those and other objects have been achieved by the invention herein claimed.

This invention finds particular utility as an improvement in a film assemblage that is especially adapted for efficient and reliable use with a cooperating photographic holder. The film assemblage comprises:

a photosensitive film sheet having leading and trailing ends;

an elongate carrier sheet having first and second outward-facing surfaces, said carrier sheet including leading and trailing end sections and an intermediate section between said end sections, said film sheet being detachably attached to said first outward-facing surface of said intermediate section with said leading and trailing ends thereof oriented toward said leading and trailing end sections respectively, said leading end section extending longitudinally beyond said intermediate section and terminating in a tab, said trailing end section extending longitudinally beyond said intermediate section and having a transversely disposed light-locking element secured thereto; and a light-shielding envelope removably enclosing said carrier sheet and said film sheet, said envelope having first and second exterior surfaces overlying said first and second outward-facing surfaces respectively, said envelope including longitudinally extending leading and trailing end portions overlying said leading and trailing end sections respectively, said leading end portion being sealed closed, said trailing end portion being closable by cooperative engagement with said light-locking element, said leading end portion including first and second graspable zones, said first graspable zone overlying said tab so that, when grasped, said first zone is pressed against said tab, said second graspable zone not overlying said tab so that, when grasped, said second zone is not pressed thereagainst, said trailing end portion having a transversely disposed movement-limiting element secured to said first exterior surface thereof, said envelope being removable from said carrier sheet and film sheet by longitudinal relative movement therebetween in a direction separating said trailing end portion form said light-locking element.

The cooperating photographic holder with which such an assemblage is adapted for use includes:

a substantially rectangular-shaped housing having parallel, spaced-apart front and rear walls, opposing sides, and oppositely disposed first and second end regions, the front wall having a frame portion defining a film-exposure window, the first end region having means defining an access opening configured to permit ingress and egress of said film assemblage along a movement path extending to and from, respectively, a seated position wherein said film sheet is aligned with the window and said light-locking element is in the second end region;

a substantially flat pressure-applying member movably disposed between and substantially parallel with the housing front and rear walls, the pressure-applying member being movable in directions transverse to the front wall and normally urged by influence of biasing means thereon toward the movement path, to press said film assemblage, when it its seated position, against the front wall frame portion;

movement blocking means movably disposed in the housing second end region, the blocking means being movable in directions transverse to the front wall and normally urged by influence of biasing means thereon toward the movement path, to engage said light-locking element, when in its seated position, and thereby block movement thereof toward the access opening;

movement arresting means movably disposed between the front wall frame portion and the access opening, the arresting means being movable in directions transverse to the front wall and normally urged by influence of biasing means thereon toward the movement path, to engage said envelope movement-limiting element during movement thereof from its seated position toward the access opening, and thereby arrest further movement thereof toward that opening, the arresting means having camming means extending therefrom, and engageable by said light-locking element during movement thereof from its seated position toward the access opening, for deflecting and guiding said light-locking element toward the arresting means, to thereby facilitate continued movement thereof toward the access opening; and a releasing member movably disposed between the pressure-applying member and the housing rear wall, the releasing member being movable in first and second opposing directions extending toward the housing first and second end regions respectively, the releasing member being normally urged by influence of biasing means thereon in the first direction to a rest position, the releasing member being configured for manual movement in the second direction away from the rest position, the releasing member having means thereon operatively associated with the pressure-applying member and the blocking and arresting means, and responsive to the manual movement in the second direction, for negating the biasing means influences normally urging the pressure-applying member and the blocking and arresting means toward the movement path, to remove the pressure-applying member and the blocking and arresting means form the path and thereby release said film assemblage for unrestricted movement therealong from its seated position and through the access opening.

According to the claimed improvement in a film assemblage adapted for use with such a holder, the assemblage light-locking element comprises:

first means thereon adapted to engage and follow the camming means extending from the arresting means, during movement of said light-locking element from its seated position toward the access opening, for causing said light-locking element to be deflected and guided by the camming means toward the arresting means; and second means thereon defining a clearance opening disposed to be aligned with the arresting means, during movement of said light-locking element from its seated position toward the camming means, and configured to exceed and thereby receive the arresting means during continued movement of said light-locking element from the camming means to the arresting means;

whereby said light-locking element moves freely past the arresting means during said movement thereof from its seated position toward the access opening.

This invention, and its objects and advantages, will become more apparent in the detailed description of the preferred embodiment thereof presented hereinbelow.

BRIEF DESCRIPTION OF THE DRAWINGS

In the detailed description of the preferred embodiment of this invention presented below, reference is made to the accompanying drawings, wherein like reference numerals denote like elements, and wherein:

FIG. 1 is a top-plan view of a photographic film assemblage, or film packet, constructed and configured in accordance with the preferred embodiment of this invention, showing the packet in its fully assembled and closed condition;

FIG. 2 is a top-plan view of the film packet depicted in FIG. 1, showing a light-shielding envelope thereof as withdrawn from a photosensitive film sheet therein;

FIG. 3 is an enlarged top-plan view of the film packet of FIG. 1 in its fully assembled and closed condition, showing (via broken lines) the photosensitive film sheet and a carrier sheet therefor as hidden within the light-shielding envelope;

FIG. 4 is an elevational view of the film packet of FIG. 3;

FIGS. 14 and 15 are partial cross-sectional elevations showing another region of the film holder as taken along line 14/15—14/15 in FIG. 8, FIG. 14 depicting operative components disposed in respective rest positions, FIG. 15 illustrating those components as normally moved to their actuated positions to release a film packet (not shown) for unrestricted withdrawal from the holder.

DESCRIPTION OF THE PREFERRED EMBODIMENT

Because certain parts of photographic film assemblages and holders therefor are well known, the following description is directed in particular to those elements forming, cooperating directly with, or relating to, this invention. Elements not specifically shown or described herein are selectable from those known in the relevant art.

Figure 5:
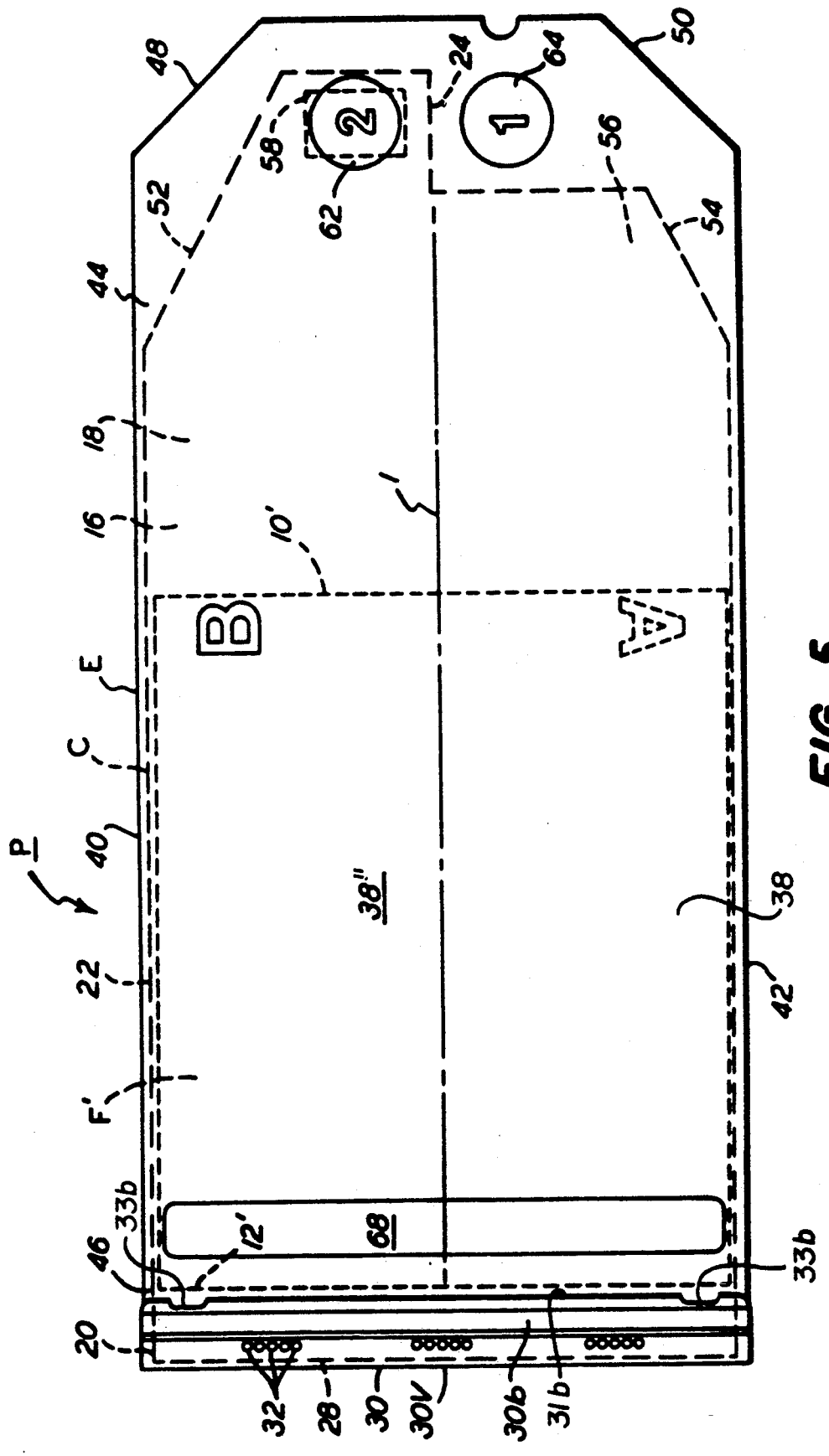
FIG. 5 is an enlarged bottom-plan view similar to FIG. 3 but showing (via broken lines) a second photosensitive film sheet on the other side of the carrier sheet.
Figure 6:
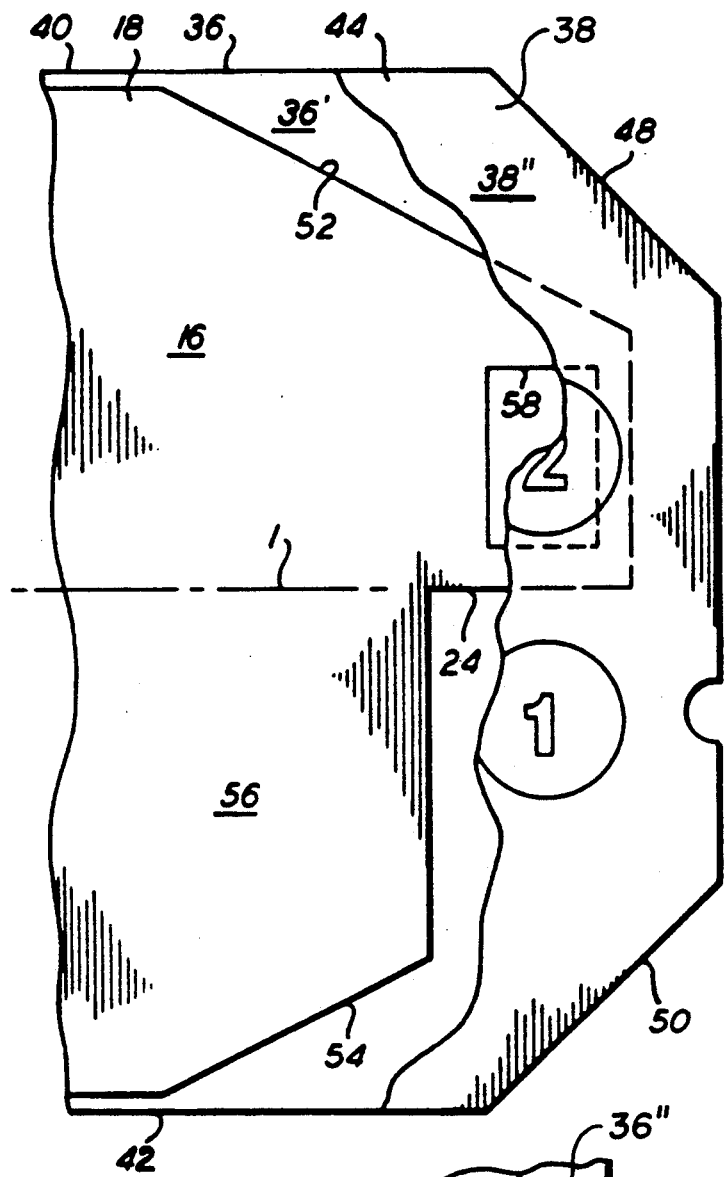
FIG. 6 is an enlarged partial view of the film packet as depicted in FIG. 5, with the light-shielding envelope broken away to reveal a leading end section of the carrier sheet therewithin.
Figure 7:
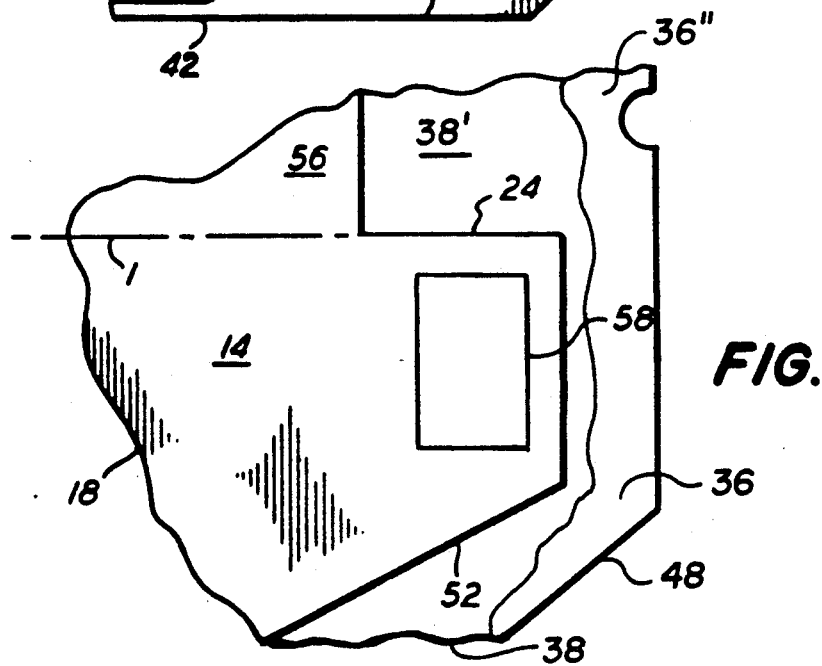
FIG. 7 is an enlarged partial top-plan view of the leading end section of the carrier sheet, showing details of a tab portion thereof.
Figure 8:
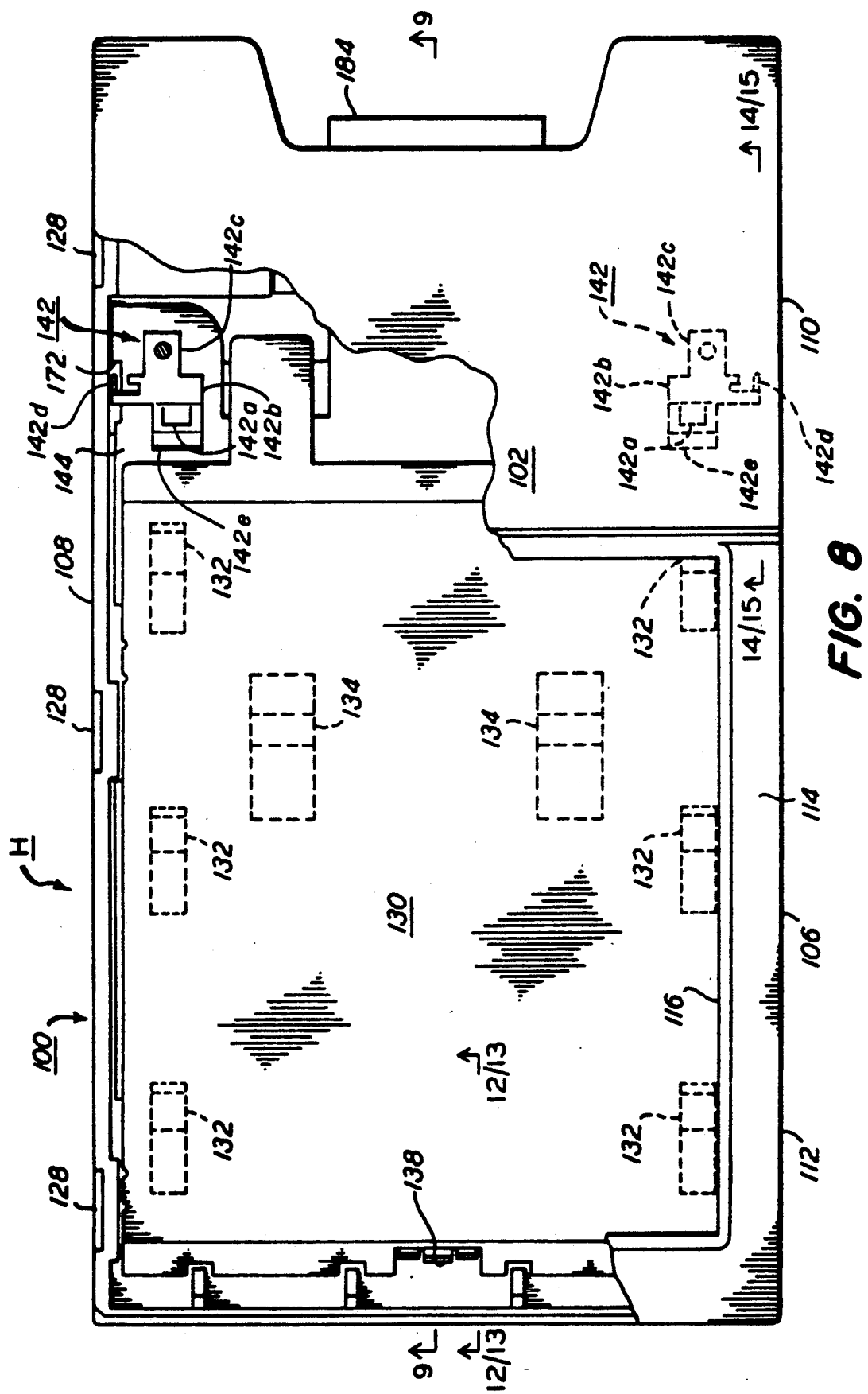
FIG. 8 is a top-plan view of a photographic film holder in which the film packet of FIGS. 1-7 is adapted for use on a cooperating camera back, with portions shown broken away for clarity of illustration.

FIGS. 1-7 illustrate a photographic film assemblage, or film packet, constructed and configured, according to the preferred embodiment of this invention, for cooperative use with the holder of FIGS. 8-18. FIGS. 1, 3, and 5 present plan views of such a packet, designated generally therein by the letter P, as it appears when in its fully assembled and closed condition.

FIG. 1 shows only the exteriorly visible components of packet P, as viewed from a first side thereof, including a light-shielding envelope E made of cardboard or other opaque material. As illustrated in FIG. 2, envelope E removably encloses a photosensitive film sheet F having leading and trailing ends 10 and 12, respectively, and an elongate carrier sheet C, to which film sheet F is detachably attached for facilitating use of the film sheet.

FIGS. 3 and 5 present, respectively, top-plan and bottom-plan views of packet P, FIG. 3 showing the first side thereof seen in FIG. 1, FIG. 5 showing the opposite, or second, side. It will thus be seen in FIGS. 3 and 5 that carrier sheet C (shown in broken lines) has first and second outward-facing surfaces 14 and 16 respectively. The carrier sheet includes leading and trailing end sections 18 and 20, respectively, and an intermediate section 22 between the two end sections. As seen in FIG. 3, film sheet F is detachably attached to the first outward-facing surface 14 of intermediate section 22, with its leading and trailing ends 10 and 12 respectively oriented toward the leading and trailing end sections 18 and 20. Similarly, as seen in FIG. 5, a second photosensitive film sheet F' is detachably attached to the second outward-facing surface 16 of intermediate section 22, with its leading and trailing ends 10' and 12' respectively oriented toward leading and trailing end sections 18 and 20.

Leading end section 18 extends longitudinally beyond intermediate section 22 (to the right, as viewed in FIGS. 3 and 5) and terminates in a tab 24 projecting therefrom as shown. Trailing end section 20 extends longitudinally beyond intermediate section 22 (to the left, as viewed in FIGS. 3 and 5) and includes a transverse edge 28, along which is secured a transversely disposed light-locking element 30. Element 30 may be secured to end section 20 by crimping it thereto, as illustrated by the three series of dimples 32 extending parallel with, and adjacent to, edge 28.

As shown in FIG. 4 (which presents an end view of element 30), the light locking element is generally V-shaped in cross section, having a vertex 30v with diverging first and second flange portions 30a and 30b extending angularly therefrom over the first and second outward-facing surfaces 14 and 16, respectively, of end section 20 and terminating in outward-projecting edges 31a and 31b. As shown in FIGS. 3 and 5, edges 31a and 31b have spaced-apart pairs of openings, or cutouts, 33a and 33b, respectively, located near the lateral ends of element 30. When secured to end section 20 as shown, element 30 provides first and second recesses 34a and 34b disposed, respectively, between flange portions 30a and 30b and the outward-facing surfaces 14 and 16 of end section 20.

Light-shielding envelope E comprises first and second opposing walls 36 and 38, respectively, which are joined along their lateral edges 40 and 42 to provide a sleeve-like enclosure for receiving the carrier sheet and attached film sheets. The opposing interior surfaces of walls 36 and 38 comprise first and second inward-facing surfaces 36' and 38' (see FIGS. 6 and 7) that respectively overlie the first and second outward-facing surfaces 14 and 16 of carrier sheet C when received therebetween. In like manner, the corresponding exterior surfaces of walls 36 and 38 comprise first and second outward-facing surfaces 36" and 38" (see FIGS. 1-7) that respectively overlie the carrier sheet surfaces 14 and 16.

The envelope further includes longitudinally extending leading and trailing end portions 44 and 46 that respectively overlie the leading and trailing end sections 18 and 20 of the carrier sheet. Leading end portion 44 is sealed closed along its outer edges, and its corners are beveled as shown at 48 and 50. Trailing end portion 46 by itself is left open to permit insertion and withdrawal of the carrier sheet and film sheets therethrough; but when those sheets are fully inserted as shown in FIGS. 1 and 3-5, end portion 46 is closed by entry thereof into recesses 34a and 34b and compressive engagement with flange portions 30a and 30b of light-locking element 30.

To facilitate insertion of the carrier and film sheets through end portion 46 and fully into the envelope, the carrier sheet leading end section is beveled as shown at 52 and 54, and the two film sheets F and F' are detachably attached to the carrier sheet at their leading ends 10 and 10'. Also, to facilitate detaching the film sheets from the carrier sheet after withdrawal from the envelope, each film sheet is detachably attached only at its leading end, so that its trailing end and image area can be easily lifted from the carrier sheet and its leading end then peeled off.

It will be seen in FIGS. 3 and 5-7 that the tab 24 on carrier sheet leading end section 18 is eccentrically disposed, relative to the carrier sheet longitudinal center line 1, and that it extends farther from intermediate section 22 than does ay other portion of leading end section 18. That is to say, the leading end section 18 extends asymmetrically relative to center line 1 such that it has a longer portion, including tab 24, disposed at one side of the center line and a shorter portion 56, not including tab 24, at the other side of said line.

As illustrated in FIGS. 3 and 5-7, tab 24 includes a rectangular aperture 58 cut through it. Although shown as rectangular, aperture 58 could as well take some other shape.

Referring now to FIGS. 3 and 5, the envelope leading end portion 44 comprises first and second graspable zones 62 and 64, respectively, which are transversely aligned with each other. It will be seen that the first graspable zone 62 overlies tab aperture 58, so that, when grasped, the opposing envelope walls in zone 62 are squeezed together through aperture 58, thereby helping to prevent unintended relative movement between the envelope and the carrier sheet. It will also be noted that the second graspable zone 64 does not overlie tab 24 at all. Instead, it overlies a region inside the envelope that is transversely spaced from the tab and longitudinally spaced from the leading end section shorter portion 56, i.e., it overlies no part of the leading end section. Consequently, when grasped, the opposing envelope walls in zone 64 are squeezed together, entirely apart from the leading end section, so that relative movement between the envelope and the carrier sheet is not prevented.

As shown in FIGS. 1-5, the envelope first and second walls 36 and 38 have a pair of movement-limiting elements, or stop strips, 66 and 68 transversely disposed on their outward-facing exterior surfaces 36" and 38", respectively, near the envelope trailing end portion 46. Strips 66 and 68 may be made of cardboard or plastic and adhered or sealed to their respective envelope wall surfaces. Their thickness or height above those surfaces must be sufficient to be readily engageable by one or more cooperating members in a compatible film packet holder such as that described below.

FIGS. 8-18 illustrate a photographic film packet holder H with which the film packet P, described above, is adapted for use on a cooperating camera back (not shown). The holder H comprises a substantially rectangular-shaped housing 100 having parallel, spaced-apart front and rear walls 102 and 104 respectively, opposing sides 106 and 108, and oppositely disposed first and second end regions 110 and 112 respectively.

The front wall 102 includes a frame portion 114 defining a film-exposure window 116. The first end region 110 includes an access opening 118 configured to permit ingress and egress of film packet P along a movement path 120 extending to and from, respectively, a seated position wherein the packet film sheets F and F' are aligned with window 116 and the packet light-locking element 30 is located in second end region 112.

Figure 9:
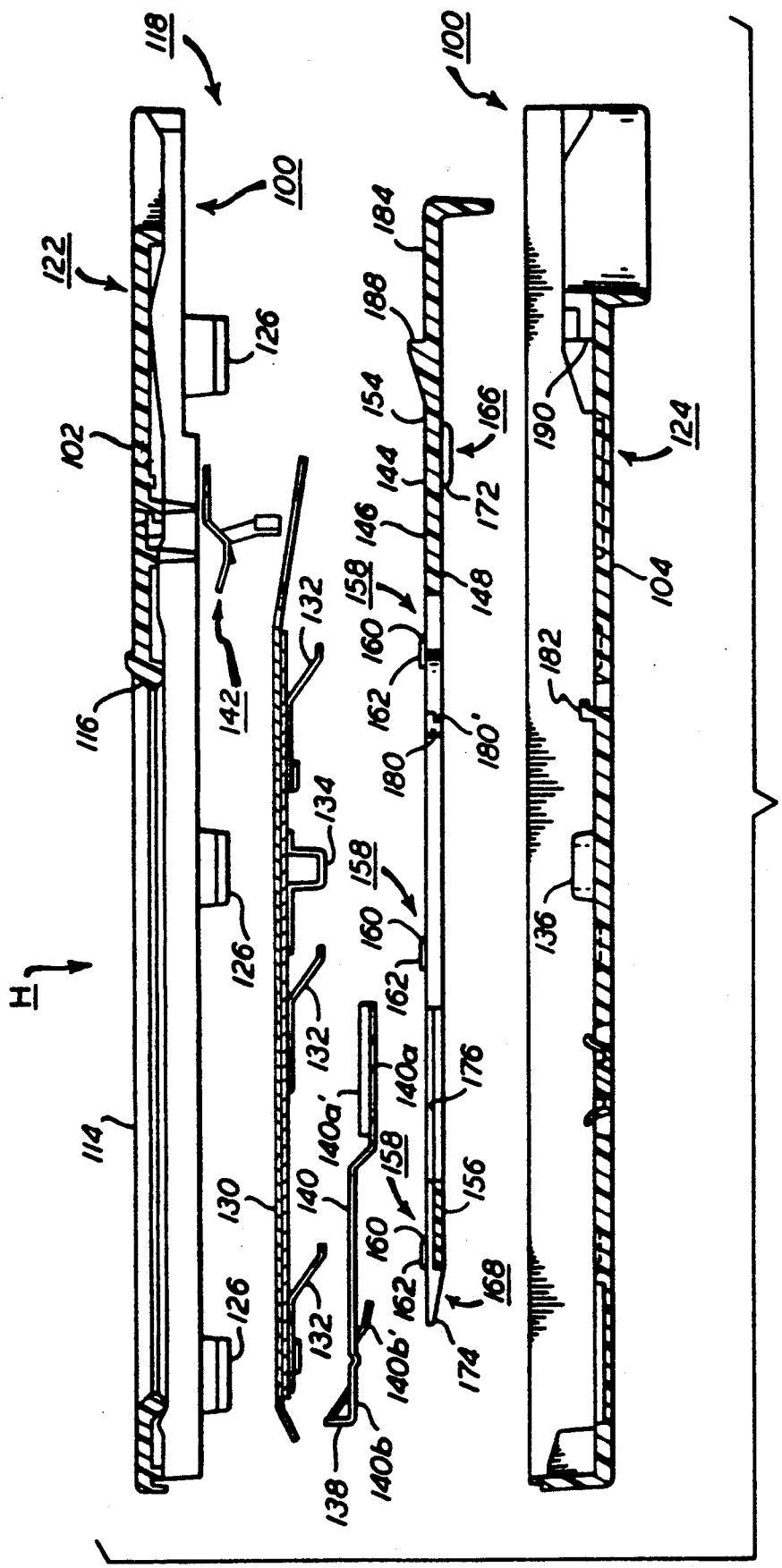
FIG. 9 is a cross-sectional elevation of the film holder of FIG. 8, taken along line 9—9 therein, showing its principal components in exploded form.

As shown most clearly in FIG. 9, housing 100 comprises separately formed front and rear components 122 and 124 which include the front and rear walls 102 and 104 respectively, the two components being light-tightly fitted together with access opening 118 and movement path 120 disposed therebetween. Preferably, each of the front and rear components 122 and 124 is an integral molded plastic piece; and such components include matable interlocking means for snap-fitting them together. Such means are shown as comprising a plurality of resiliently flexible latching fingers 126, which depend from front wall 102 along both sides of front component 122, and a like plurality of mating channels 128 correspondingly located in both side walls of rear component 124.

Inside housing 100, in housing rear component 124, is a substantially flat pressure-applying member, or plate, 130 movably disposed between and substantially parallel with the housing front and rear walls 102 and 104. Plate 130 is movable in directions transverse to the front wall and is normally urged, by influence of biasing means thereon, toward movement path 120 so as to press the film packet, when in its seated position, against the front wall frame portion 114. Biasing means for so urging the pressure-applying plate is shown as comprising a plurality of spring elements 132 depending angularly from the plate toward rear wall 104. To guide movement of plate 130 in directions transverse to front wall 102, and to locate the plate and restrain it from moving in directions parallel with that wall, a pair of guide elements 134 also depend from the plate toward rear wall 104. Guide elements 134 are configured to fit slidably into a pair of correspondingly located hollow bosses 136 that project form rear wall 104 toward the plate.

Also in housing rear component 124 is a movement blocking means comprising a member 138 movably disposed in the housing second end region 112. Blocking member 138 also is movable in directions transverse to the front wall; and it too is normally urged by influence of biasing means thereon toward movement path 120, but in this case to engage the packet light-locking element 30, when the packet is in its seated position, to thereby block movement of element 30 toward access opening 118. Biasing means for so urging blocking member 138 is depicted as comprising a cantilever spring element 140 having a fixed end portion 140a secured to rear wall 104 and a movable free end portion 140b resiliently supporting member 138. Fixed end portion 140a includes a pair of flanges 140a' extending laterally therefrom in spaced parallel relation to rear wall 104. Free end portion 140b is bifurcated as shown to provide a pair of engageable legs 140b' depending angularly therefrom toward rear wall 104.

Movably mounted on housing front component 122, between front wall frame portion 114 and access opening 118, is a movement arresting means comprising a spaced-apart pair of arresting members 142 respectively disposed near the housing sides. Each of the arresting member 142 is movable in directions transverse to front wall 102; and each of them is normally urged, by influence of biasing means thereon, toward movement path 120, but in this case to engage the packet envelope movement-limiting element (stop strip 66 or 68) then facing front wall 102 during movement thereof from its seated position toward the access opening, to thereby arrest further movement thereof toward the opening. Each arresting member 142 includes a protruding edge portion 142a that is normally biased toward path 120 by a cantilever spring element 142b having a fixed end portion 142c secured to front wall 102 and a movable spring leg 142d which depends from element 142b toward rear wall 104. Extending angularly from edge portion 142a toward second end region 112 is a camming means comprising a deflecting ramp 142e disposed for engagement by the packet light-locking element 30 during movement thereof toward the access opening, to deflect and guide element 30 past the arresting member and thereby facilitate continued movement thereof toward the opening. To further facilitate movement of element 30 past the two arresting members 142, the outward-projecting edges 31a and 31b of flange portions 30a and 30b are provided with the aforementioned paris of openings, or cutouts, 33a and 33b, respectively. The cutouts are aligned with burt made slightly narrower than the deflecting ramps 142e, so that the adjacent portions of the confronting one of edges 31a and 31b will engage and ride on those ramps toward the protruding edge portions 142a. However, the cutouts are aligned with but made slightly larger than the protruding edge portions 142a, so as to allow the engaged one of flange portions 30a and 30b to move freely past those protruding edge portions and thence to the access opening.

Slidably mounted in housing rear component 124, between plate 130 and rear wall 104, is a releasing member, or slider, 144, which preferably is formed as an integral molded plastic piece. Slider 144 is movable in first and second opposing directions extending toward the first and second end regions 110 and 112 respectively. The slider is normally urged, by influence of biasing means thereon, in the first direction to a rest position (shown in FIG. 10), and is adapted for manual movement in the second direction away from that position (see arrow in FIG. 11).

Slider 144 is provided with means, operatively associated with plate 130, blocking member 138, and arresting members 142, and responsive to said manual movement in the second direction, for negating the aforementioned biasing means influences that normally urge plate 130 and members 138 and 142 toward movement path 120, so as to remove the plate and the blocking and arresting members from said path and thereby release the film packet for unrestricted movement therealong from its seated position and out through the access opening.

The slider has front and rear surfaces 146 and 148 facing plate 130 and rear wall 104 respectively, lateral portions 150 and 152 that extend along housing sides 106 and 108 respectively, and first and second end portions 154 and 156 directed toward the first and second end regions 110 and 112 respectively.

The slider negating means, mentioned above, comprises camming means 158 on front surface 146, including a plurality of ramps 160 in lateral portions 150 and 152 and a like plurality of projections 162 and depressions 164 respectively disposed at opposite ends of the ramps. The front surface camming means 158 interacts with the spring elements 132 that depend angularly from plate 130, to control their biasing influence on the plate.

The slider negating means further comprises camming means 166 and 168 in first and second end portions 154 and 156, respectively, which interact with the arresting member spring legs 142d and the blocking member spring legs 140b', respectively, to control their respective biasing influences on the arresting and blocking members. The first end portion camming means 166 includes a pair of laterally projecting ears 170 and 172 respectively disposed in lateral portions 150 and 152 adjacent to housing sides 106 and 108, in engageable relation with spring legs 142d. The second end portion camming means 168 includes a tapered tab 174 that is bifurcated to provide a pair of tapered tab portions 174' which project longitudinally toward blocking member 138 for symmetrical engagement with spring legs 140b' about their common longitudinal center line.

To guide longitudinal movement of slider 144 in its first and second directions, and to locate the slider and restrain it from moving in other directions, a pair of recessed sections 176 are provided to fit slidably between the laterally extending flanges 140a' and opposing areas of rear wall 104.

Figure 10:
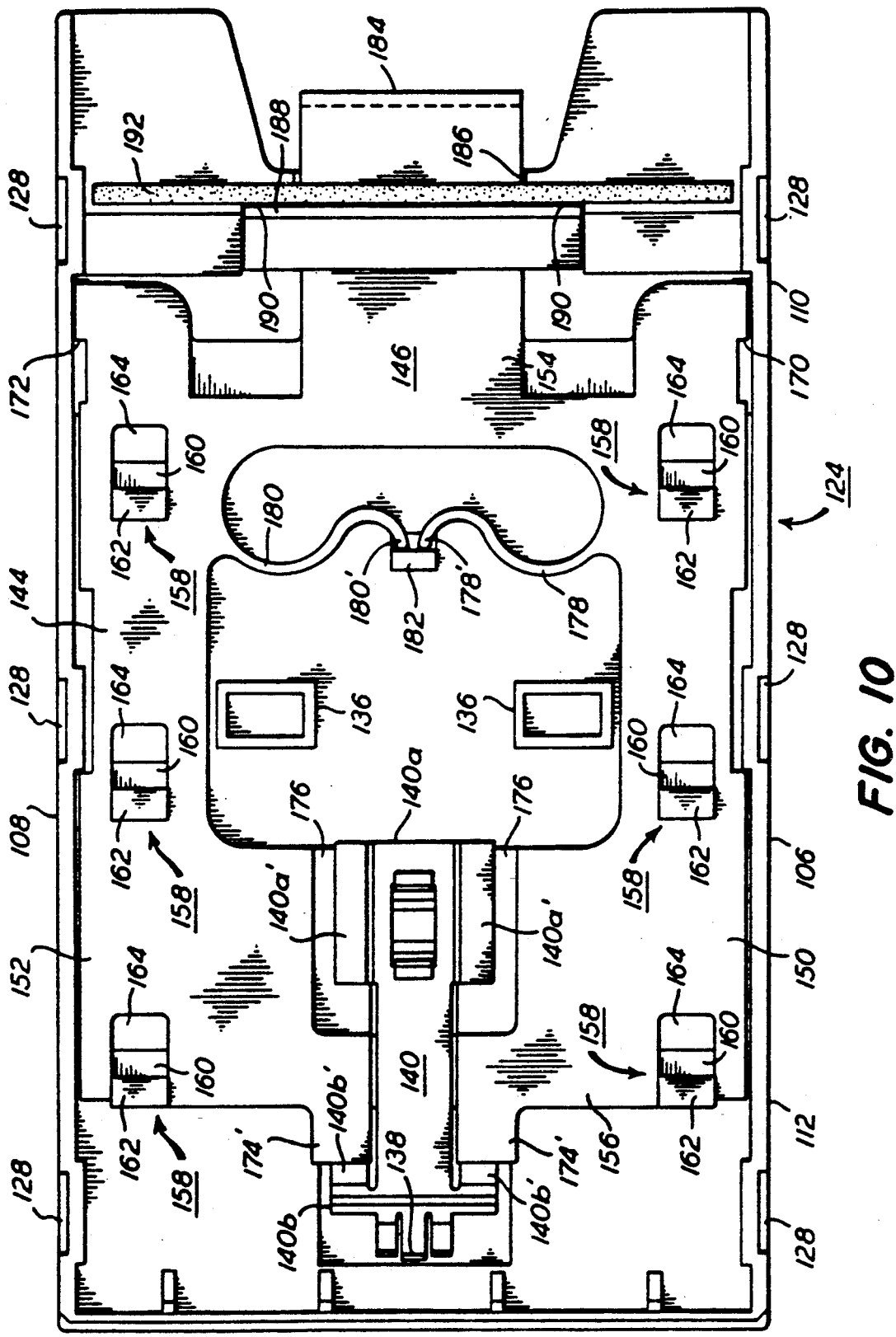
FIG. 10 is a top-plan view of the film holder of FIGS. 8-9, with upper components thereof removed to reveal details of certain lower components as disposed in respective rest positions.
Figure 11:
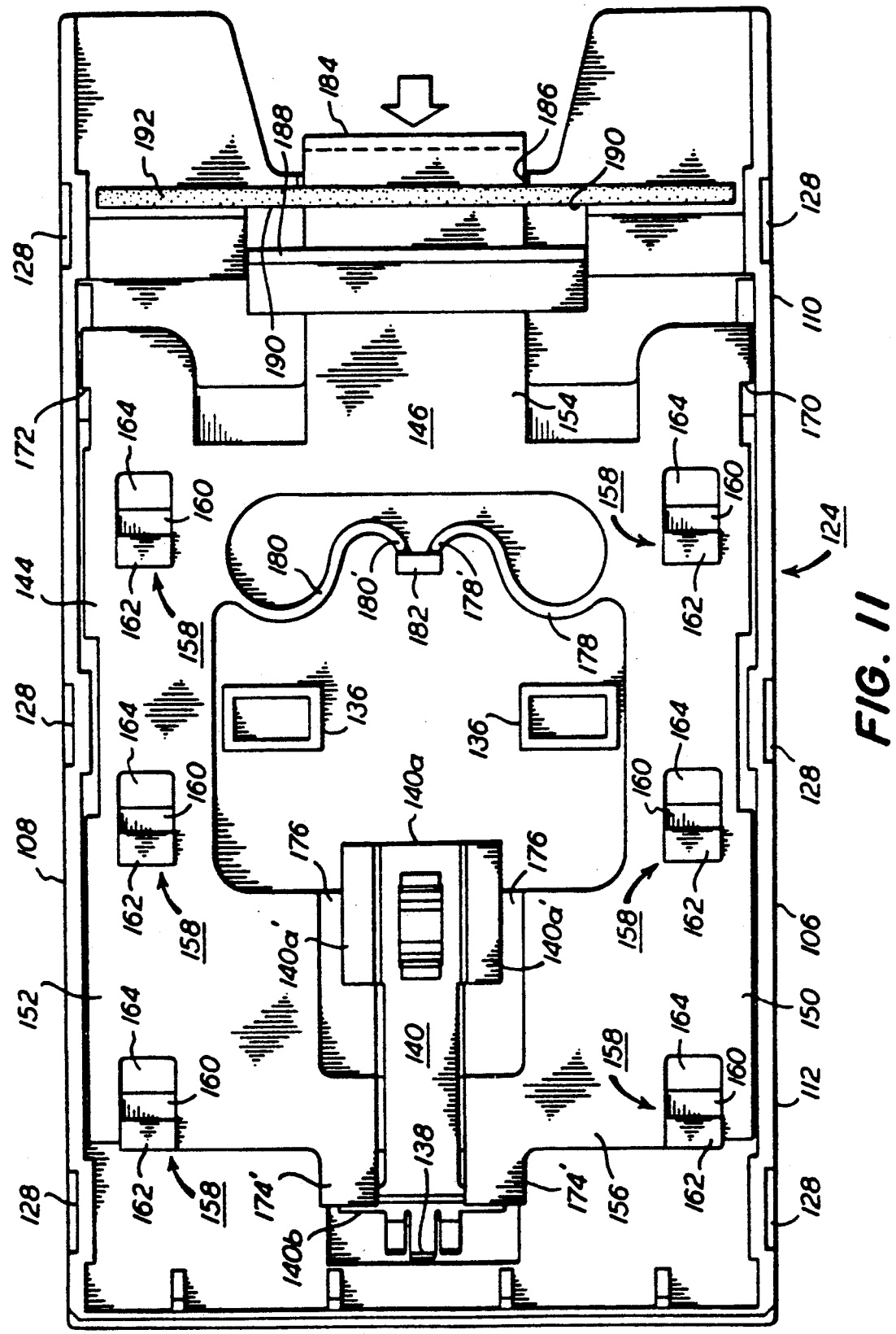
FIG. 11 is a top-plan view similar to FIG. 10 but showing the same lower components as moved to their fully actuated positions.

The aforementioned biasing means normally urging slider 144 in the first direction to tis rest position shown in FIG. 10 comprises a pair of S-shaped cantilever springs 178 and 180 that extend transversely from lateral portions 150 and 152, respectively, toward each other, with their free ends 178' and 180' trapped by a flanged tab 182 centrally disposed on rear wall 104.

To facilitate the aforementioned manual movement of slider 144 in the second direction away from its rest position (see arrow in FIG. 11), the slider is provided with externally accessible means, including an L-shaped handle 184, that extends form first end portion 154 through a passageway 186 in housing first end region 110 adjacent to access opening 118.

To limit slider return movement (by springs 178 and 180) in the first direction, and thereby define its rest position, the slider includes a transversely disposed stopping member 188 that abuts opposing surfaces 190, which project from rear wall 104 at opposite sides of passageway 186, when the rest position is reached.

The stopping member also coacts with a transversely disposed, pliant, light-sealing element 192, to help prevent light from entering the holder housing through passageway 186 when the slider is in its rest position. Element 192 extends from passageway 186, into access opening 118, and into the movement path 120, so as to contact film packet P and thereby help prevent light from entering the housing through the access opening.

Operation of holder H in use with packet P will now be described.

Figure 12:
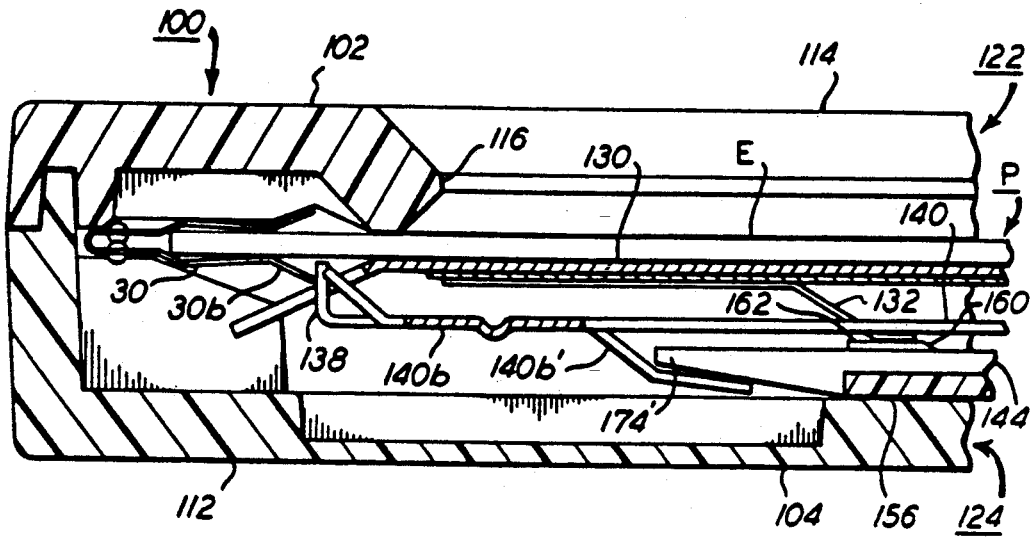
FIGS. 12 and 13 are partial cross-sectional elevations showing an end region of the film holder as taken along line 12/13—12/13 in FIG. 8, FIG. 12 depicting operative components disposed in respective rest positions with a film packet locked thereby in a seated position, FIG. 13 illustrating the same components in their actuated positions with the film packet thus released and moving away from the seated position.
Figure 13:
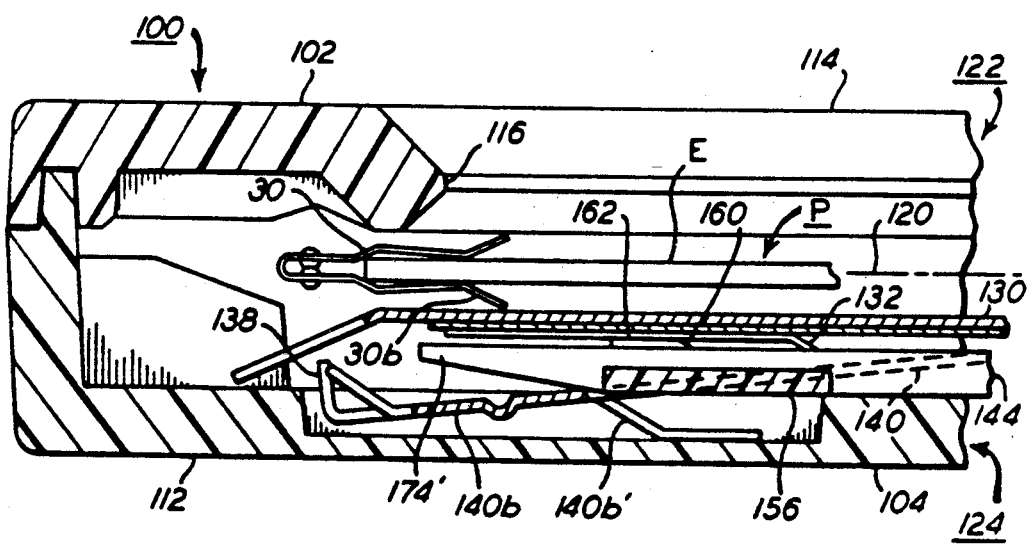

When slider 144 is in its rest position (shown in FIG. 10), spring elements 132, which depend angularly from plate 130, are in resilient engagement with projections 162 on the slider, and thereby provide the biasing influence that urges the plate toward the movement path so as to press packet P (when in its seated position) against front wall frame portion 114. Also, as shown in FIG. 12, spring legs 140b', which depend angularly from free end portion 140b of spring element 140, are engaged by tapered tab portions 174' on the slider, while free end portion 140b resiliently supports blocking member 138 in its position blocking the packet light-locking element 30. Also, as shown in FIG. 14, spring legs 142d, which depend from their respective cantilever spring elements 142b of arresting members 142, are disposed in engageable relation with, but not yet engaged by, ears 170 and 172 on the slider, while the spring elements 142b maintain the arresting member protruding edge portions 142a in their movement-path positions for engagement by the packet movement-limiting stop strip 66 or 68 then facing front wall 102.

Now, when slider 144 is moved from its rest position to its fully actuated position (shown in FIG. 11), by pushing handle 184 inwardly (see FIG. 11 arrow) against the biasing influence of springs 178 and 180, the above-described negating means is actuated to effect its intended functions. The slider projections 162 are thus moved out of engagement with spring elements 132, which in turn follow ramps 160 downwardly (as viewed in FIGS. 14 and 15) into depressions 164. That action negates the biasing influence that urged plate 130 toward the movement path. Also, the slider tapered tab portions 174' are moved into further engagement with spring legs 140b' so as to cam them downwardly (as viewed in FIGS. 12 and 13), against the biasing influence of spring element 140, and thereby move blocking member 138 downwardly away form the movement path. Also, the slider ears 170 and 172 are moved into engagement with spring legs 142d so as to pivot them clockwise (as viewed in FIGS. 14 and 15), against the biasing influences of spring elements 142b, and thereby pivot the arresting member protruding edge portions 142a clockwise (upwardly) out of the movement path. It will thus be seen that, by a single actuation of handle 184, the pressure-applying plate 130, the blocking member 138, and the arresting members 142 are all moved away form the movement path, thereby permitting unrestricted movement of the film packet into and out of the holder.

Upon releasing handle 184, the slider is returned to its rest position by springs 178 and 180, causing the foregoing actions to be reversed and the pressure-applying plate and the blocking and arresting members to be restored to their described film-path positions.

A significant advantage of this holder is that a film packet may easily be inserted into and withdrawn from it whether or not the holder is mounted on a camera back.

To use film packet P with holder H, first the packet side labeled "A" in FIGS. 1 and 3 should be oriented to face the holder film-exposure window 116. Then, with slider handle 184 depressed to actuate slider 144, the packet should be inserted through access opening 118 until it reaches its seated position. Now, with handle 184 released and the holder mounted on a camera back, with its window 116 facing the camera lens, the packet envelope should be grasped at its graspable zone 64 (labeled 1 in FIGS. 1–3), pulled outwardly, and thereby withdrawn until it is stopped by engagement of its stop strip 66 with the arresting member protruding edge portions 142a disposed in the movement path, while the carrier and film sheets are retained in their seated position by engagement of light-locking element 30 with blocking member 138 also in the movement path. The film sheet F is thus uncovered and ready for a photographic exposure via the camera shutter and lens.

After that exposure, the envelope should again be grasped at zone 64 (again, 1 in FIGS. 1–3) and pushed in to its seated position, thereby re-covering the now-exposed film sheet. Then, with handle 184 again depressed to actuate slider 144, to thereby release the packet for unrestricted withdrawal (as explained above), the envelope should be grasped at zone 62 (labeled 2 in FIGS. 1–3), so as to squeeze the envelope walls in that zone together through the aperture 58 in tab 24, and the whole packet thus pulled out of the holder. The packet may then be turned over so that its side labeled "B" in FIG. 5 faces the holder window 116, and the foregoing steps repeated to effect a photographic exposure of the other film sheet. F'.

With both film sheets now exposed and safely re-covered by the envelope and light-locking element 30, the envelope walls again become squeezed together through tab aperture 58 when the packet is once again grasped at zone 62 (labeled 2 in FIG. 5) and removed from the holder. With the film sheets still protected by the envelope and light-locking element, the packet may then be safely handled, stored, and/or transported until disassembled for processing under controlled light conditions.

Figure 16:
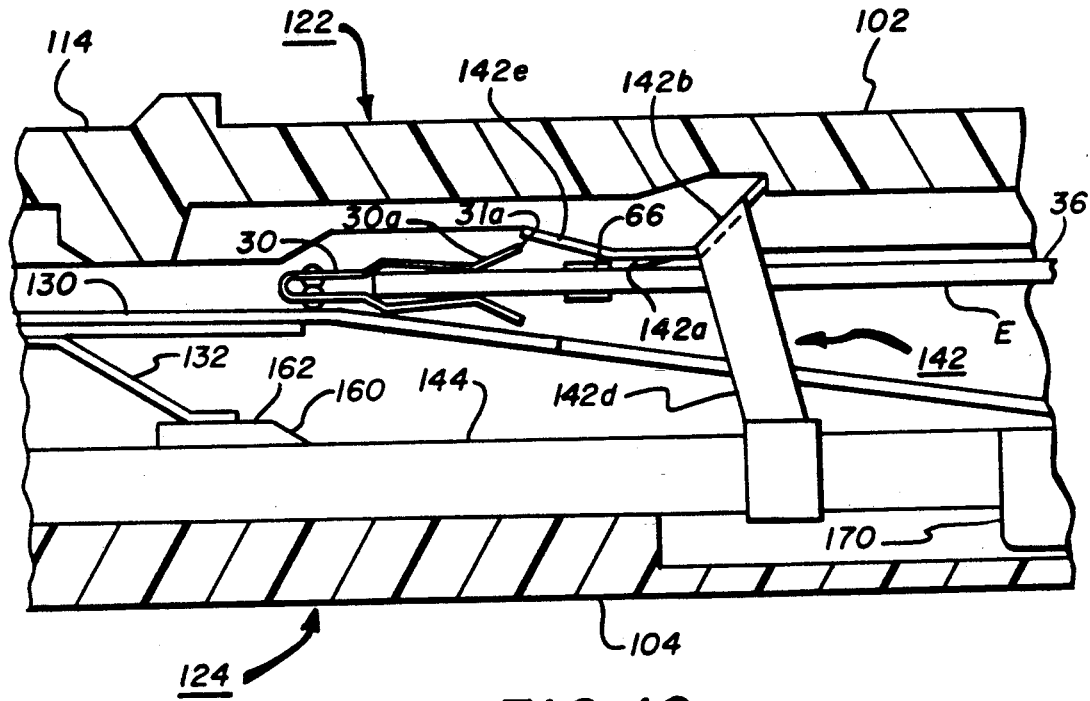
FIGS. 16-18 are partial cross-sectional elevations similar to FIG. 14, all portraying operative components in their rest positions while a released film packet is being withdrawn, FIG. 16 showing the packet's movement-limiting and light-locking elements approaching the holder's movement arresting means, FIG. 17 depicting the light-locking element engaged with camming means on the arresting means, FIG. 18 illustrating the light-locking element moving freely past the arresting means.
Figure 17:
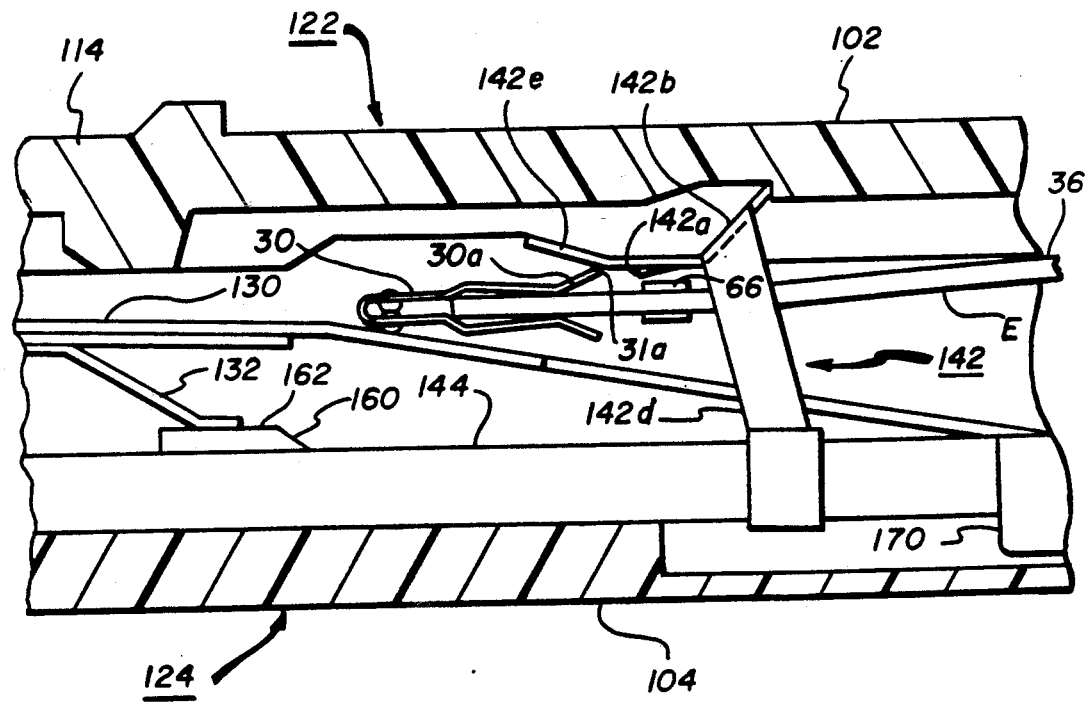
Figure 18:
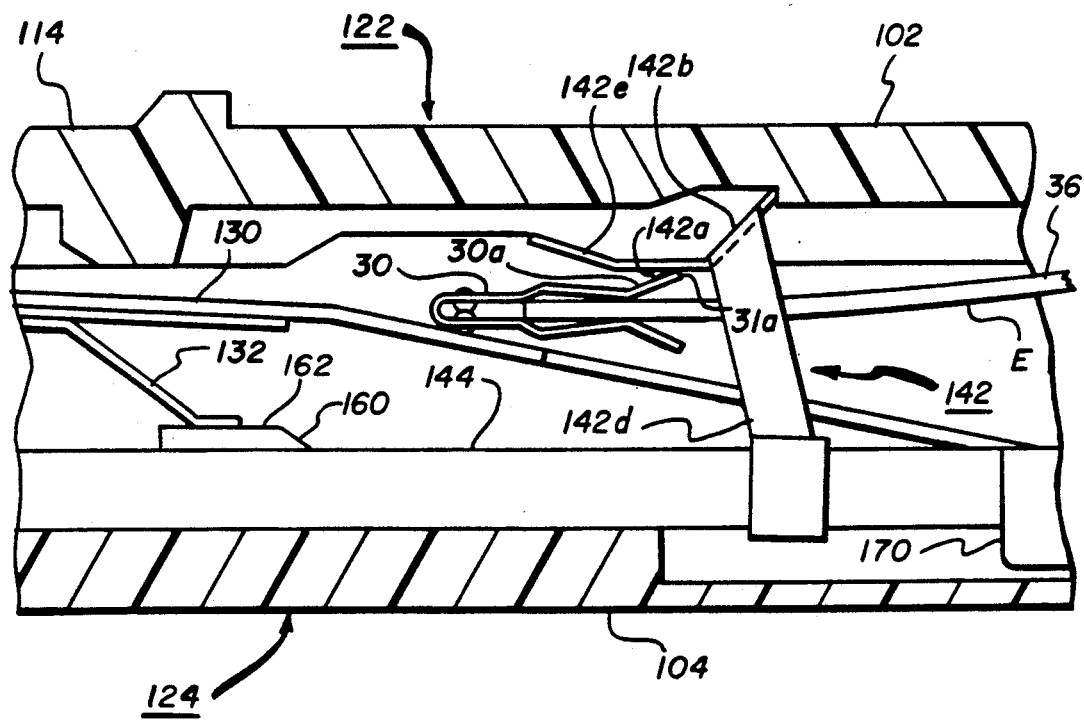

Preferably, in the foregoing procedure for withdrawing the packet from the holder, handle 184 should be held fully depressed, so as to keep slider 144 in its fully actuated position, until the packet has been completely removed. It may occur, however, that the user, after first depressing handle 184 and thereby releasing light-locking element 30, lets go of the handle, and thereby allows slider 144 to return to tis rest position, before the envelope stop strip 66 or 68 has passed the arresting members 142. FIGS. 16–18 illustrate what happens in that situation, wherein the arresting members have returned to their movement-path positions while the packet is still being withdrawn. FIG. 16 shows both stop strip 66 and light-locking element 30 as they are approaching arresting member 142. FIG. 17 shows element 30 after it has engaged the arresting member ramp 142e and is being deflected thereby downwardly (as viewed in FIG. 17). As element 30 is thus deflected, the stop strip 66 preceding it also is deflected downwardly so as to clear the protruding edge portion 142a. FIG. 18 shows element 30 after the confronting edge 31a on its flange portion 30a has passed ramp 142e and is just clearing edge portion 142a because of the cutouts 33a provided in that edge. It will thus be seen that, with the arresting member ramps 142e disposed to intercept and deflect element 30 so as to guide stop strip 66 past the protruding edge portions 142a, and with the flange portion edge cutouts 33a providing clearance for element 30 to then ride past edge portions 142a, the film packet can still be freely withdrawn even when the arresting members have prematurely resumed their movement-path positions after the blocking member 38 has first been actuated to release element 30.

The present invention has now been described in detail with particular reference to its preferred embodiment as illustrated herein. It will be understood, however, that variations and modifications can be effected within the spirit and scope of this invention.

We claim:

1. In a film assemblage adapted for use with a cooperating photographic holder, said film assemblage comprising:

a photosensitive film sheet having leading and trailing ends;

an elongate carrier sheet having first and second outward-facing surfaces, said carrier sheet including leading and trailing end sections and an intermediate section between said end sections, said film sheet being detachably attached to said first outward-facing surface of said intermediate section with said leading and trailing ends thereof oriented toward said leading and trailing end sections respectively, said leading end section extending longitudinally beyond said intermediate section and terminating in a tab, said trailing end section extending longitudinally beyond said intermediate section and having a transversely disposed light-locking element secured thereto; and a light-shielding envelope removably enclosing said carrier sheet and said film sheet, said envelope having first and second exterior surfaces overlying said first and second outward-facing surfaces respectively, said envelope including longitudinally extending leading and trailing end portions overlying said leading and trailing end sections respectively, said leading end portion being sealed closed, said trailing end portion being closable by cooperative engagement with said light-locking element, said leading end portion including first and second graspable zones, said first graspable zone overlying said tab so that, when grasped, said first zone is pressed against said tab, said second graspable zone not overlying said tab so that, when grasped, said second zone is not pressed thereagainst, said trailing end portion having a transversely disposed movement-limiting element secured to said first exterior surface thereof, said envelope being removable from said carrier sheet and film sheet by longitudinal relative movement therebetween in a direction separating said trailing end portion from said light-locking element;

the cooperating photographic holder including:

a substantially rectangular-shaped housing having parallel, spaced-apart front and rear walls, opposing sides, and oppositely disposed first and second end regions, the front wall having a frame portion defining a film-exposure window, the first end region having means defining an access opening configured to permit ingress and egress of said film assemblage along a movement path extending to and form, respectively, a seated position wherein said film sheet is aligned with the window and said light-locking element is in the second end region;

a substantially flat pressure-applying member movably disposed between and substantially parallel with the housing front and rear walls, the pressure-applying member being movable in directions transverse to the front wall and normally urged by influence of biasing means thereon toward the movement path, to press said film assemblage, when in its seated position, against the front wall frame portion;

movement blocking means movably disposed in the housing second end region, the blocking means being movable in directions transverse to the front wall and normally urged by influence of biasing means thereon toward the movement path, to engage said light-locking element, when in its seated position, and thereby block movement thereof toward the access opening;

movement arresting means movably disposed between the front wall frame portion and the access opening, the arresting means being movable in directions transverse to the front wall and normally urged by influence of biasing means thereon toward the movement path, to engage said envelope movement-limiting element during movement thereof form its seated position toward the access opening, and thereby arrest further movement thereof toward that opening, the arresting means having camming means extending therefrom, and engageable by said light-locking element during movement thereof from its seated position toward the access opening, for deflecting and guiding said light-locking element toward the arresting means, to thereby facilitate continued movement thereof toward the access opening; and a releasing member movably disposed between the pressure-applying member and the housing rear wall, the releasing member being movable in first and second opposing directions extending toward the housing first and second end regions respectively, the releasing member being normally urged by influence of biasing means thereon in the first direction to a rest position, the releasing member being configured for manual movement in the second direction away from the rest position, the releasing member having means thereon operatively associated with the pressure-applying member and the blocking and arresting means, and responsive to the manual movement in the second direction, for negating the biasing means influences normally urging the pressure-applying member and the blocking and arresting means toward the movement path, to remove the pressure-applying member and the blocking and arresting means from the path and thereby release said film assemblage for unrestricted movement therealong from its seated position and through the access opening;

an improvement wherein said film assemblage light-locking element comprises:

first means thereon adapted to engage and follow the camming means extending from the arresting means, during movement of said light-locking element from its seated position toward the access opening, for causing said light-locking element to be deflected and guided by the camming means toward the arresting means; and second means thereon defining a clearance opening disposed to be aligned with the arresting means, during movement of said light-locking element from its seated position toward the camming means, and configured to exceed and thereby receive the arresting means during continued movement of said light-locking element from the camming means to the arresting means;

whereby said light-locking element moves freely past the arresting means during said movement thereof from its seated position toward the access opening.

2. A film assemblage improvement as claimed in claim 1, the cooperating holder arresting means including a protruding edge portion normally urged, by the biasing means influence thereon, into engageable relation with said envelope movement-limiting element, the camming means extending from the arresting means including a deflecting ramp extending from the protruding edge portion into engageable relation with said light-locking element, wherein:

said first means on said light-locking element comprises an edge portion thereof projecting toward, and engageable with, the deflecting ramp; and said second means on said light-locking element comprises an edge portion thereof defining said clearance opening disposed to be aligned with, and configured to exceed, the protruding edge portion.

3. A film assemblage improvement as claimed in claim 1, the cooperating holder arresting means comprising a pair of arresting members respectively disposed near the housing sides, each arresting member having a protruding edge portion normally biased into engageable relation with said envelope movement-limiting element, the camming means extending from such arresting means comprising a deflecting ramp extending from the protruding edge portion of each arresting member into engageable relation with said light-locking element, wherein:

said first means on said light-locking element comprises an edge portion thereof projecting toward, and engageable with, the deflecting ramp extending from the protruding edge portion of each arresting member; and said second means on said light-locking element comprises an edge portion thereof defining a clearance opening disposed to be aligned with, and configured to exceed, the protruding edge portion of each arresting member.

4. A film assemblage improvement as claimed in claim 3 wherein:

said first means on said light-locking element includes an edge portion thereof on each side of each clearance opening; and each clearance opening is configured to be narrower than the deflecting ramp and wider than the protruding edge portion of the arresting member with which it is to be aligned.

5. A film assemblage improvement as claimed in claim 4 wherein:

said first means edge portion on each side of each clearance opening is adjacent to said clearance opening; and each clearance opening is formed as an edge portion cutout that opens toward the arresting member with which it is to be aligned.

6. A film assemblage improvement as claimed in claim 1 wherein:

said tab is eccentrically disposed, relative to an imaginary longitudinal center line of said carrier sheet, and extends farther from said intermediate section than does any other portion of said leading end section; and said first and second graspable zones are transversely aligned with each other, so that said second zone overlies a region inside said envelope that is longitudinally beyond said any other portion of said leading end section.

7. A film assemblage improvement as claimed in claim 1 wherein:

said leading end section extends asymmetrically relative to an imaginary longitudinal center line of said carrier sheet, said leading end section having a longer portion thereof, including said tab, disposed at one side of said center line and a shorter portion thereof, not including said tab, disposed at the other side of said center line; and said first and second graspable zones are disposed in transverse alignment with each other, so that said second zone overlies a region inside said envelope that is longitudinally beyond said shorter portion.

8. A film assemblage improvement as claimed in claim 1 wherein:

said tab includes means defining an aperture therein; and said first graspable zone overlies said aperture.

9. A film assemblage improvement as claimed in claim 1 wherein said film sheet is detachably attached to said first outward-facing surface of said intermediate section at said leading end thereof only.

10. A film assemblage improvement as claimed in claim 1 further comprising a second photosensitive film sheet, said second film sheet being detachably attached to said second outward-facing surface of said intermediate section.

* * * * *

UNITED STATES PATENT AND TRADEMARK OFFICE
CERTIFICATE OF CORRECTION

PATENT NO. : 4,994,836
DATED : February 19, 1991
INVENTOR(S) : Quenter H. Loose and Robert P. Bresnan It is certified that error appears in the above-indentified patent and that said Letters Patent is hereby corrected as shown below:

In Col. 1, line 7, change "453,392" to -- 453,892 --.

In Col. 2, line 7, change "neat" to -- near --.

In Col. 5, line 15, indent "FIG. 3".

In Col. 6, line 60, change "light locking" to -- light-locking --.

In Col. 7, line 48, change "ay" to -- any --.

Between Col. 8, line 68, and Col. 11, line 1, insert the attached copy of missing Cols. 9-10.

Signed and Sealed this

Thirteenth Day of July, 1993

Attest:

MICHAEL K. KIRK

*Attesting Officer*     *Acting Commissioner of Patents and Trademarks*